United States Patent [19]

Smith, Jr.

[11] 3,882,066

[45] May 6, 1975

[54] ADHESIVE COMPOSITION COMPRISING COAL-TAR PITCH AND OLEFINIC COPOLYMERS

[75] Inventor: Wayne E. Smith, Jr., Franklin Township, Westmoreland County, Pa.

[73] Assignee: United States Steel Corporation, Pittsburgh, Pa.

[22] Filed: Apr. 30, 1971

[21] Appl. No.: 139,196

Related U.S. Application Data

[63] Continuation of Ser. No. 714,456, March 20, 1968, abandoned.

[52] U.S. Cl. ............................................ 260/28.5 AS
[51] Int. Cl. ............................................ C08f 45/52
[58] Field of Search. 260/28.5 R, 28.5 AV, 28.5 AS

[56] References Cited
UNITED STATES PATENTS

| 3,132,120 | 5/1964 | Graham | 260/78.5 HC |
|---|---|---|---|
| 3,215,678 | 11/1965 | Adelman | 260/80.5 |
| 3,361,692 | 1/1968 | Parkinson | 260/28.5 AS |
| 3,392,131 | 7/1968 | Miles | 260/28.5 |
| 3,392,132 | 7/1968 | D'Ascoli | 260/28.5 AS |
| 3,541,035 | 11/1970 | Baum | 260/28.5 AV |

OTHER PUBLICATIONS

Schildknecht, "Polymer Processes," 1956, Interscience Pub., p. 62.

*Primary Examiner*—Joseph L. Schofer
*Assistant Examiner*—P. R. Michl
*Attorney, Agent, or Firm*—John R. Pegan

[57] ABSTRACT

Thermoplastic compositions comprising coal-tar pitch and a copolymer of ethylene and an ethylenically unsaturated carboxylic acid containing from 3 to 8 carbon atoms. The compositions exhibit high strength in shear and peel over a wide temperature range.

12 Claims, No Drawings

3,882,066

ADHESIVE COMPOSITION COMPRISING COAL-TAR PITCH AND OLEFINIC COPOLYMERS

This application is a continuation of Ser. No. 714,456 filed Mar. 20, 1968 and now abandoned.

BACKGROUND OF THE INVENTION

1. Field of the Invention

This invention relates to thermoplastic adhesives or "hot-melts" that in the heated condition are easily applied to substrates to be bonded and on cooling become solid and attain full strength. The bonds exhibit high tensile shear and peel strengths over a wide service-temperature range and may be obtained even where the surfaces are relatively dirty. More particularly, the invention relates to a composition comprising a coal-tar pitch and a copolymer of ethylene containing reactive carboxyl groups which may be modified by the addition of the usual filler materials.

2. Description of the Prior Art

Thermoplastic resins have heretofore been added to a coal-tar pitch in order to take advantage of its low cost and durability and to overcome its mechanical weakness, brittleness and poor adhesion. Some resins, such as polyethylene, may in themselves possess many desirable properties but have difficulty in adhering strongly to metals or other substrates. In general, high-strength adhesives that are currently available are expensive and require substrate surfaces, especially metal surfaces, to be cleaned carefully. Many adhesives lose their adhesive strength under environmental conditions of high or low temperature, of high moisture or of attack by bacteria.

SUMMARY OF THE INVENTION

My invention comprises compositions by weight between about 0.1 and 75 percent of a coal-tar pitch and between about 99.9 and 25 percent of a copolymer of ethylene and an ethylenically unsaturated carboxylic acid containing from 3 to 8 carbon atoms. To this composition may be added up to about 50 percent by weight of the usual finely-divided commercial filler materials.

The advantages of my compositions over prior art thermoplastic adhesives include:

1. High tensile shear and peel strengths at temperatures between about −67° and 145°F.
2. Improvement in moisture resistance and to bacterial attack.
3. Decreased sensitivity to dirty surfaces.

DESCRIPTION OF A PREFERRED EMBODIMENT

A pitch suitable for the purposes of the invention is preferably that derived from coal tar. Useful pitches range in ring-and-ball softening points between about 70° and 200°C, a preferred range being between about 100° and 150°C.

The copolymers of ethylene with unsaturated carboxylic acids, suitable for purposes of this invention are known. A method for preparing copolymers is disclosed in Graham et al, U.S. Pat. No. 3,132,120, issued May 5, 1964. The ethylenically unsaturated carboxylic-acid component of the resin may comprise a monocarboxylic or dicarboxylic acid having from 3 to 8 carbon atoms such as acrylic acid, methacrylic acid, ethacrylic acid, fumaric acid, maleic acid, itaconic acid, crotonic acid and the like. Useful copolymers may vary in melt index from about 0.1 to about 400, the preferred range being between about 5 and 40. The acid content of useful copolymers may range between about 0.1 and 75 percent by weight of the copolymer. The acid range of commercially available copolymers with acrylic acid is between about 0.1 and 40 percent by weight of the copolymer. The preferred acid range of the latter is between about 2 and 20 percent, since above about 20 percent the products increase in crystallinity. In the above classification, useful commercially available ethylene-ethylenically unsaturated carboxylic-acid copolymers include ZETAFIN QX 3623.7; QX 3623.22 and QX 3623.24, sold by Down Chemical Co. These resins have about the same acrylic acid content, namely, about 6.8 percent. However, the melt indexes vary, the respective melt indexes beig about 5, 20 and 40. Other useful copolymers are EA 9000, EA 9300 and EA 9320, sold by Union Carbide Corp. These resins vary in both acrylic acid content and melt index. The respective acid contents are about 14, 20 and 16 percent. The respective melt indexes are about 5, 50 and 5. Another useful copolymer is EMAZZ, sold by Monsanto Co. This resin is an ethylene-maleic acid copolymer, having an acid content of about 70 percent.

These compositions may be made less costly or given improved properties by the addition thereto of the usual commercial filler materials, in the usual quantities. These may include zirconium silicate, aluminum silicate, iron oxide, talc and aluminum powder.

It has been found that the broad limits for an adhesive composition comprise in per cent by weight between about 0.1 and 75 percent of coal-tar pitch and between about 99.9 and 25 percent of an ethylene-ethylenically unsaturated carboxylic-acid copolymer. A preferred composition comprises between about 20 and 50 percent pitch and between about 50 and 80 percent resin. Filler material may be added to these basic compositions. The broad limits for filler material addition comprise between 0 and about 50 percent by weight of a basic composition, preferably between 0 and about 20 percent.

It has been found that the above compositions when blended, for example, in a rubber mill or an extruder produce an adhesive with excellent strength properties over a wide temperature range, when compared with known compositions. The tensile shear strength, peel strength and tear resistance are excellent, as are the resistance to moisture and bacteriological attack. The adhesives are easy to apply to substrate surfaces even though they have had a minimum or no prior cleaning.

Ethylene-ethylenically unsaturated carboxylic-acid copolymers may be used as adhesives. With relatively small additions of coal-tar pitch, however, the composition properties improve, more particularly, the peel strength. The overall properties of the compositions will vary somewhat with the mix proportions. With a 25:75 pitch to copolymer ratio these properties will generally be somewhat better than with a 50:50 ratio. With increasing pitch content the compositions become harder and more heat resistant, but the overall properties do become somewhat poorer so that with a 75:25 pitch to copolymer ratio, the compositions may be unsatisfactory for some applications. The overall properties of the compositions will generally be somewhat better when the pitch that is used has a softening point that is on the high side of the pitch softening-point range. The application-temperature, however, is advantageously lower with use of a pitch having a lower softening point. The application temperature is the optimum bonding temperature at which a test specimen exhibits maximum tensile shear adhesion strength. The overall properties of the pitch-resin compositions will also vary somewhat with the resin that is used and may even vary somewhat with the method of blending.

A complete understanding of the invention may be obtained from the following typical examples of process showing how the compositions are made and giving some of the properties thereof. In all examples, the components are given in percentages by weight. The designated properties were determined by standard ASTM methods, more particularly, D1002-53T (tensile shear strength) and D903-49 (peel strength).

Examples 2–6, a lower result at one temperature is usually accompanied by a higher result at another temperature. Comparing Examples 4 and 6, comprising 50:50 compositions with different pitches, the tensile shear strengths are comparable. The peel strengths with the 110°C melting point pitch are somewhat lower than with 150°C pitch. The respective application temperatures are 250° and 350°F. Hence, with 110°C pitch, maximum joint strength is developed at a lower temperature. The results are tabulated in Table 1. Some of the test results at −67°F are shown with an asterisk in both Tables 1 and 2. Here, a true value could not be obtained, since the yield strength of the steel substrates was exceeded before the adhesive joints broke.

TABLE 1

| Components Weight Per cent | Ex. 1 | Ex. 2 | Ex. 3 | Ex. 4 | Ex. 5 | Ex. 6 |
|---|---|---|---|---|---|---|
| Pitch 150°C | — | 25 | 37 | 50 | — | — |
| Pitch 110°C | — | — | — | — | 25 | 50 |
| ZETAFIN QX 3623.7 | 100 | 75 | 63 | 50 | 75 | 50 |
| Properties | | | | | | |
| Tensile Shear Strength | | | | | | |
| psi at −67°F | 2900* | 3000* | 2850* | 2900* | 3100* | 2950 |
| 73°F | 1675 | 1900 | 1950 | 1300 | 1900 | 1200 |
| 145°F | 725 | 800 | 1050 | 450 | 725 | 500 |
| Peel Strength (180°) | | | | | | |
| ppi at −67°F | 20 | 50 | 45 | 55 | 10 | 30 |
| 73°F | 35 | 45 | 40 | 30 | 30 | 25 |
| 145°F | 15 | 45 | 25 | 35 | 30 | 20 |

EXAMPLES 1–6

ZETAFIN QX 3623.7 is a commercially available proprietary copolymer of ethylene and acrylic acid. It has an acid content of about 6.8 percent by weight and a melt index of about 5.

In Example 1, ZETAFIN QX 3623.7 alone was placed in the nip of a rubber mill, comprising two horizontal rolls turning toward each other, with a narrow slot therebetween. The rolls were preheated to a temperature of about 290°F and the resin was slowly added to the rotating rolls. After the resin pellets were melted the mill was operated for an additional 20 minutes. After removal, the product was pressed into sheets for testing. In Examples 2–6, after pellets of the same resin were melted, coal-tar pitch was added and the blend was mixed for 20 minutes and thereafter pressed into sheets for testing. In Examples 2–4, the proportions were varied for a coal-tar pitch having a ring-and-ball softening point of about 150°C. In Examples 5 and 6, the proportions were varied for a coal-tar pitch having a ring-and-ball softening point of about 110°C. Comparing Examples 1 and 2, the tensile shear and peel strengths were much better for the resinpitch composition than for the resin alone. Comparing the results for

EXAMPLES 7–12

Example 2 was repeated as Examples 7–11, to illustrate the effect on the composition of a change in the ethylene-acrylic acid copolymer. In Examples 11 and 12 the compositions were the same. In Example 12, however, the blend was extruded. The components were mixed for 20 minutes in a twin-shell blender and then fed to an extruder preheated to between 240° and 300°F. The mixture was extruded as a 0.010 inch thick film and test samples prepared therefrom. The results are tabulated in Table 2. More particularly, for ZETAFIN QX 3623.7 in Examples 2–6, there was substituted ZETAFIN QX 3623.22 in Examples 7 and 8 and ZETAFIN QX 3623.24 in Examples 9–12. ZETAFIN QX 3623.22 is an ethylene-acrylic acid copolymer having an acid content of about 6.8 percent and a melt index of about 20. ZETAFIN QX 3623.24 is an ethyleneacrylic acid copolymer having an acid content of about 6.8 percent and a melt index of about 40. Tensile shear and peel strengths of the respective examples varied somewhat from each other but not to an appreciable extent. The results in Examples 7–12 were somewhat poorer than in Examples 2–6, more particularly, in the peel strength at −67°F. The type of blending, milling or extrusion produces some variation in the results.

TABLE 2

| Components Weight Per cent | Ex. 7 | Ex. 8 | Ex. 9 | Ex. 10 | Ex. 11 | Ex. 12 |
|---|---|---|---|---|---|---|
| Pitch 150°C | 25 | — | 25 | — | 50 | 50 |
| Pitch 110°C | — | 50 | — | 50 | — | — |
| ZETAFIN QX 3623.22 | 75 | 50 | — | — | — | — |
| ZETAFIN QX 3623.24 | — | — | 75 | 50 | 50 | 50 |
| Properties | | | | | | |
| Tensile Shear Strength | | | | | | |
| psi at −67°F | 3000* | 3000* | 2700 | 2900 | 2300 | 2250 |
| 78°F | 1650 | 1050 | 1375 | 1025 | 1100 | 1700 |
| 145°F | 575 | 400 | 375 | 275 | 250 | 450 |

TABLE 2—Continued

| Components Weight Per cent | Ex. 7 | Ex. 8 | Ex. 9 | Ex. 10 | Ex. 11 | Ex. 12 |
|---|---|---|---|---|---|---|
| Peel Strength (180°) | | | | | | |
| ppi at −67°F | 5 | 5 | 5 | 1 | 20 | 5 |
| 73°F | 30 | 20 | 35 | 35 | 40 | 35 |
| 145°F | 25 | 20 | 20 | 15 | 25 | 15 |

EXAMPLE 13

Example 2 was repeated as Example 13 to illustrate the effect on the composition of a typical commercial filler material, namely, Zircon (−200 mesh), a commercial zirconium silicate. The blend comprised 33⅓ percent by weight each of 150°C pitch, ZETAFIN QX 3623.7 and Zircon. Measured at 73°F, the tensile shear strength was 1,200 psi and 180° peel was 35 ppi. These results were somewhat lower than the comparable results for Example 2.

EXAMPLES 14–19

Using an Example 3 composition (37 percent–150°C pitch and 63 percent-ZETAFIN QX 3623.7), these examples illustrate that relatively good tensile shear strengths may be obtained at 73°F regardless of the substrate surface preparation for cold rolled carbon steel or galvanized steel. The results are tabulated in Table 3.

TABLE 3

| Examples | Surface Preparations | Cold Rolled Carbon Steel | Galvanized Steel |
|---|---|---|---|
| 14 | As received from the mill | 1300 | — |
| 15 | Wiped with a dry cloth | 1600 | — |
| 16 | Acid etched | 1100 | — |
| 17 | Cleaned with an abrasive cleaner | 1700 | — |
| 18 and 19 | Vapor degreased | 1950 | 1700 |

EXAMPLES 20–31

Using an Example 3 composition (37 percent–150°C pitch and 63 percent-ZETAFIN QX 3623.7) these examples illustrate the effect of aging for various periods. Tensile shear strength specimens were aged respectively in water and air at 73° and 145°F and then tested at 73°F, the test results being summarized in Table 4. Although somewhat lower than the Example 3 results, the test results after exposure for 28 days were quite uniform, except for the poorer results after water immersion at 150°F. In any event, these tests indicate the adhesives should weather quite well.

TABLE 4

| Examples | Conditions | 7 Days | Aging Periods 14 Days | 28 Days |
|---|---|---|---|---|
| 20–22 | Water at 73°F | 1400 | 1300 | 1350 |
| 23–25 | Water at 150°F | 1000 | 1200 | 1100 |
| 26–28 | Air at 73°F | 1400 | 1400 | 1550 |
| 29–31 | Air at 150°F | 1350 | 1450 | 1550 |

It will be evident from the foregoing that my invention provides desirable adhesive compositions. While these compositions are primarily adhesives, they are also useful as protective coatings, moldings, extrusions and films. Moldings, extrusions and films may be prepared in accordance with usual extrusion practices. For these adhesives, the resistance of pitch to microbial degradation was not lessened by copolymer addition.

Although I have disclosed herein the preferred practice of my invention, I intend to cover as well any change or modification therein which may be made without departing from the spirit and scope of the invention.

I claim:

1. A composition comprising in percent by weight between about 20 and 50 percent of coal-tar pitch and between about 80 and 50 percent of a copolymer consisting essentially of ethylene and an ethylenically-unsaturated carboxylic acid containing from 3 to 8 carbon atoms, said resin having an acid content of between about 0.1 and about 75 percent by weight.

2. A composition as defined in claim 1 in which said pitch has a ring-and-ball softening point between about 70°C and 200°C.

3. A composition as defined in claim 1 in which the unsaturated carboxylic acid is acrylic acid.

4. A composition as defined in claim 3 in which said composition includes finely-divided filler material.

5. A composition as defined in claim 3 in which said resin has an acid content between about 0.1 and 40 percent by weight.

6. A composition as defined in claim 3 in which said resin has an acid content between about 2 and 20 percent by weight.

7. A composition as defined in claim 3 in which said resin has a melt index between about 0.1 and 400.

8. A composition as defined in claim 3 in which said resin has a melt index between about 5 and 60.

9. A composition as defined in claim 3 in which said pitch has a ring-and-ball softening point between about 100° and 150°C.

10. A composition as defined in claim 3 in which said pitch has a ring-and-ball softening point between about 70° and 200°C and comprises between about 25 and 50 percent by weight of the composition, and said resin has an acrylic acid content between about 0.1 and 40 percent, said resin comprising between about 50 and 75 percent by weight of the composition.

11. A composition as defined in claim 3 in which said pitch has a ring-and-ball softening point between about 70° and 200°C and comprises between about 25 and 50 percent by weight of the composition, and said resin has an acrylic acid content between about 2 and 20 percent and a melt index between about 0.1 and 400, said resin comprising between about 50 and 75 percent by weight of the composition.

12. A composition as defined in claim 3 in which said pitch has a ring-and-ball softening point between about 100° and 150°C and comprises between about 25 and 50 percent by weight of the composition, and said resin has an acrylic acid content between about 2 and 20 percent and a melt index between about 5 and 60, said resin comprising between about 50 and 75 percent by weight of the composition.

* * * * *